March 30, 1937.   L. A. LEVY ET AL   2,075,399

FLUORESCENT MATERIAL

Filed Jan. 3, 1935

INVENTORS
LEONARD ANGELO LEVY
DONALD WILLOUGHBY WEST

BY
Stebbins, Blenko & Parmelee
THEIR ATTORNEYS

Patented Mar. 30, 1937

2,075,399

UNITED STATES PATENT OFFICE 2,075,399

FLUORESCENT MATERIAL

Leonard Angelo Levy and Donald Willoughby West, London, England

Application January 3, 1935, Serial No. 248
In Great Britain May 18, 1934

3 Claims. (Cl. 250—34)

This invention consists in improvements in or relating to fluorescent material.

It has long been known that materials containing zinc and sulphur in combination as zinc sulphide will fluoresce under the stimulation of light rays and X-rays and that the fluorescence is greatly augmented if they contain small quantities of an activator or phosphorogen, for example copper. It has also been known that the colour of the fluorescence may be varied if cadmium sulphide is mixed with the zinc sulphide. The use of these fluorescent substances has been limited, however, since they all tend to exhibit the phenomenon of after-phosphorescence, that is they continue to emit radiations after stimulation by light or X-rays has been discontinued. They also exhibit the phenomenon of latent image i. e. on restimulating with X-rays an image of a former exposure reappears.

It is an object of the present invention to produce a material, containing zinc, cadmium and sulphur in combination as sulphides, which will fluoresce when stimulated, but in which after-phosphorescence is practically eleminated so that the material is particularly suitable for the production of viewing screens and intensifying screens for use with X-rays and similar activating rays.

We have found that the phenomenon of after-phosphorescence and persistence of latent image may be attributed to a great extent to the impurities contained in the material and also to copper when it is added as a phosphorogen, and that these phenomena may be eliminated by producing zinc and cadmium sulphides in a high state of purity and as free as possible from any trace of copper and all heavy metals except such as we have found it is desirable to include specially as phosphorogens, and as inhibitors of after-phosphorescence, for example we have found that it is desirable that small quantities of silver (and, when the fluorescent material is to be used for making viewing screens, manganese as well) should be present as phosphorogens and also that small quantities of nickel should be present as an inhibitor of after-phosphorescence. We have described the action of nickel as inhibitor in the specification of our co-pending United States application Serial No. 732,828.

According to the present invention a material which fluoresces under the stimulation of X-rays but shows no appreciable after-phosphorescence comprises a mixture consisting of zinc sulphide and cadmium sulphide, both in a high state of purity, a small trace of silver as phosphorogen, and a minute trace of nickel as inhibitor of after-phosphorescence.

It has been found that the purification of the essential materials is a matter of outstanding importance. According to a prior suggestion fluorescent zinc sulphide and zinc-cadmium sulphide should contain substantially less impurity than one part in one hundred thousand. We have found that the presence of heavy metals, such as nickel in proportions as high as one part in two hundred thousand would preclude the preparation of a luminescent material of any commercial value in connection with X-ray viewing screens. It is necessary that a much higher state of purity should be obtained. The purification should be carried out so that the majority of impurities, particularly compounds of the heavy metals such as copper, iron, etc., are absent. Experiment has shown that efficient results can be obtained if certain impurities are still present provided that they are not present in quantities exceeding one part in one million, but it is desirable that even greater purity should be obtained if possible. It is to be understood that we do not wish to preclude the presence, prior to firing, of salts such as ammonium salts which assist in the firing process, but which as far as can be ascertained are completely removed by the firing.

Once the main constituents of the material have been obtained in this high state of purity, very small quantities of silver, or manganese, or of a mixture of silver and manganese, are added as the activator or phosphorogen. The silver, or manganese, or mixture of silver and manganese, should be present in small traces only; for example, about 1 part in 20,000, the addition being made at any time prior to the heating of the sulphides to form the fluorescent material. The metals may be added either in the elemental state or as salts.

We have found it is also desirable to add a very minute quantity of nickel which we have found acts as an inhibitor of the phenomenon of after-phosphorescence and latent image. The nickel should be added only in very minute quantities as otherwise it will act to diminish greatly the value of the product.

Although according to the invention copper is eliminated as far as possible, in certain circumstances very small quantities of copper, for example one part in one million, may be included in order to brighten the fluorescence since, although the copper will increase the after-phosphorescence, which it is the object of the invention to reduce, it is found that if the quantity of copper so added is very small the after-phosphorescence is not increased to an objectionable extent, and, furthermore, by adding nickel as an inhibitor at the same time the after-phosphorescence resulting from the copper may be very materially reduced.

According to one method of preparing fluorescent materials in accordance with the present invention cadmium sulphide and zinc sulphide are precipitated in the purest possible condition and then mixed together in the requisite proportions. The mixture after the addition of silver, or of manganese, or of a mixture of silver and manganese as the phosphorogen, and of nickel as inhibitor is dried and heated to a high temperature of about 1200° to 1300° C.

In carrying out the present invention in practice the actual details of the process will depend to a great extent on the particular raw materials employed, but generally speaking, the zinc sulphide and cadmium sulphide are first prepared in a state of purity such that no one heavy metal impurity is present in a proportion greater than one in one million parts and preferably no one impurity is present in proportions as high as this. When the fluorescent material is to be employed for making viewing screens we prefer to add a mixture of silver and manganese. These two metals may for example be added so that together they are present in a proportion of one part in twenty thousand. If on the other hand the fluorescent material is to be employed for making intensifying screens we prefer to use silver alone as the phosphorogen, since we have found that for intensifying screens manganese should be rigorously excluded.

At the same time as the addition of the phosphorogen a small trace of nickel is added. The nickel is preferably added in the form of a soluble salt such as nickel chloride and is added in such quantities that it is present in a proportion of about one part in five million or in smaller proportions. The actual quantity added will be dependent on the state of purity of the zinc and cadmium sulphides. It is often found that small proportions of nickel are present in these compounds and if they are present after purification then only sufficient additional nickel should be added to make the proportion up to say one in five million. This figure is given by way of example but experiments seem to show that it is in excess of the quantity actually required and much lower proportions of nickel have been found to be effective, for example one part in ten million or even one part in twenty million have been found to inhibit the phenomena of after-phosphorescence and latent image. It is found that the actual heating conditions have some influence on the amount of nickel required.

If it is desired to add copper to the material in order to brighten the fluorescence, the addition is made at the same time as the addition of the phosphorogen and the nickel, and it is found that when such an addition is made it is desirable to add a slightly higher proportion of nickel dependent on the quantity of copper added.

After the various additions enumerated above have been made the whole is dried and heated to a high temperature, for example about twelve hundred to thirteen hundred degrees centigrade when the desired material is obtained. We have found that the properties of the final material depend to a great extent on the length of time for which heating is continued, and that good results are obtained only if the heating is continued for a sufficient length of time. The actual time of heating depends upon a number of factors, for example, whether the crucible is placed in a hot or cold furnace, the shape of the vessel, the size of the crucible and the exact nature of the precipitate, i. e. the quantity of foreign salts, such as ammonium chloride which may be present.

The fluorescent materials prepared in accordance with the present invention are particularly useful for the manufacture of viewing screens for X-ray work, but they may also be employed for other types of screens for use with X-rays and other activating rays. It is known that the color of the fluorescence of such materials may be modified by varying the proportions of cadmium and zinc. We have found that materials particularly suitable for the production of viewing screens may be obtained if the cadmium sulphide is present in a proportion of fifteen to forty per cent of the mixture.

We wish it to be understood that the proportions given above all relate to the material prior to the firing process.

An X-ray screen constructed in accordance with the present invention is illustrated by way of example in the accompanying drawing in which.

Figure 1:
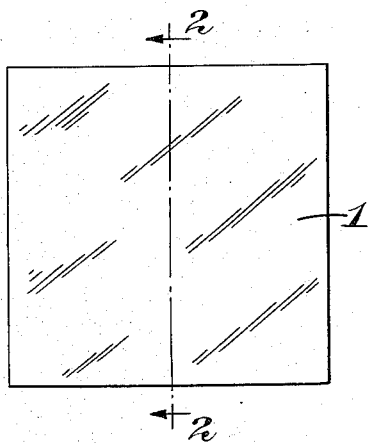
Figure 1 shows the screen in elevation.
Figure 2:
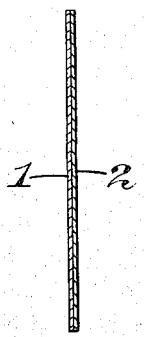
Figure 2 shows a section on the line 2—2 of Figure 1.

In the drawing, 1 represents the support and 2 the layer of fluorescent material comprising a mixture consisting of zinc sulphide and cadmium sulphide, both in a high state of purity, a small trace of silver, together with a small proportion of manganese as phosphorogen, and a minute trace of nickel as the inhibitor of after-phosphorescence, that is, a fluorescent material which fluoresces under the stimulation of X-rays but shows no appreciable after-phosphorescence according to the present invention and as described above.

We claim:

1. A material which fluoresces under the stimulation of X-rays but shows no appreciable after-phosphorescence comprising a mixture consisting of zinc sulphide and cadmium sulphide, both in a high state of purity, a small trace of silver together with a small proportion of manganese as phosphorogen, and a minute trace of nickel as the inhibitor of after-phosphorescence.

2. A material which fluoresces under the stimulation of X-rays but shows no appreciable after-phosphorescence comprising a mixture consisting of zinc sulphide and cadmium sulphide, both in a high state of purity, a small trace of silver and a small proportion of manganese as phosphorogen the mixture of silver and manganese being present in a proportion of about one part in twenty thousand, and a minute trace of nickel as inhibitor of after-phosphorescence.

3. An X-ray screen which fluoresces under the stimulation of X-rays but does not exhibit after-phosphorescence made up from a fluorescent material comprising a mixture consisting of zinc sulphide and cadmium sulphide, both in a high state of purity, a small trace of silver, together with a small proportion of managanese as phosphorogen, and a minute trace of nickel as the inhibitor of after-phosphorescence.

LEONARD ANGELO LEVY.
DONALD WILLOUGHBY WEST.